United States Patent [19]

Lautier et al.

[11] 4,262,356
[45] Apr. 14, 1981

[54] METHOD AND SYSTEM FOR SYNCHRONIZING A TDMA COMMUNICATION NETWORK COMPRISING A SATELLITE EQUIPPED WITH SEVERAL DIRECTIONAL BEAM ANTENNAS TRANSMITTING SIGNALS AT VARIOUS FREQUENCIES

[75] Inventors: Alex Lautier, Nice; Jean L. Monrolin, La Gaude, both of France

[73] Assignee: IBM Corporation, Armonk, N.Y.

[21] Appl. No.: 74,933

[22] Filed: Sep. 13, 1979

[30] Foreign Application Priority Data

Sep. 15, 1978 [FR] France .................. 78 27024

[51] Int. Cl.³ .................. H04J 3/06
[52] U.S. Cl. .................. 370/104; 455/12
[58] Field of Search ............. 370/104, 57; 455/12

[56] References Cited

U.S. PATENT DOCUMENTS

| 3,641,274 | 2/1972 | Sasaki | 370/104 |
| 3,761,814 | 9/1973 | Bernasconi | 370/104 |
| 3,912,876 | 10/1975 | Muller | 370/57 |
| 4,135,156 | 1/1979 | Sandbrs | 370/57 |

*Primary Examiner*—David L. Stewart
*Attorney, Agent, or Firm*—John E. Hoel

[57] ABSTRACT

A method and a system are disclosed for synchronizing within a recurrent time frame the starting points of the transmissions from the various stations in a TDMA network wherein N stations distributed among M separate zones covered by M different down-link frequencies exchange pulse bursts through a satellite, each pulse burst being comprised of a preamble, a unique word, the transmitting station's address, and traffic data. The satellite includes a global beam antenna which covers all of the M zones and is adapted to receive M different up-link frequencies, means for converting these M up-link frequencies to M corresponding down-link frequencies, and M directional beam antennas covering the M zones, each of said M antennas being adapted to transmit the down-link frequency associated with the particular zone it covers. The bursts transmitted by the various stations are assigned a predetermined position within the frame. Each station detects whether it has received a unique word followed by the address of a given station. Upon detecting such an address, the station activates timing means which define a time interval associated with the station whose address has been detected and, at the end of that time interval, starts transmitting M successive bursts respectively destined for the M zones during predetermined time intervals within the frame. These M bursts are transmitted at different up-link frequencies so that the burst intended for a given zone will be transmitted at the up-link frequency corresponding to the down-link frequency for that zone. In accordance with an embodiment of the invention, the timing means comprise M timers respectively defining N time intervals associated with the N stations. The start of a station's transmission is determined by the timer which reaches its stopping point first.

6 Claims, 12 Drawing Figures

FRAME FORMAT

NETWORK
FIG. 1

SATELLITE
FIG. 1A

EARTH STATION

FIG. 2

FRAME FORMAT

FIG.3

DOUBLE BURST FORMAT

FIG. 4A

SINGLE BURST FORMAT

FRAME FORMAT FOR NETWORK OF 6 STATIONS IN 2 ZONES

FIG. 8

FRAME FORMAT FOR NETWORK OF 6 STATIONS IN 3 ZONES

FIG. 9

METHOD AND SYSTEM FOR SYNCHRONIZING A TDMA COMMUNICATION NETWORK COMPRISING A SATELLITE EQUIPPED WITH SEVERAL DIRECTIONAL BEAM ANTENNAS TRANSMITTING SIGNALS AT VARIOUS FREQUENCIES

FIELD OF THE INVENTION

This invention relates to systems for synchronizing satellite communication networks and, more particularly, to a method and a system for synchronizing a network which includes a satellite equipped with a plurality of directional beam antennas transmitting signals at various frequencies and which uses a Time Division Multiple Access (TDMA) technique.

BACKGROUND OF THE INVENTION

In the well-known TDMA technique, several earth stations share one of the transponders of a satellite to which they transmit pulse bursts which are received sequentially and retransmitted to the stations. The time is divided into recurring frames comprising a plurality of time slots, one of which is assigned to a given station. During its assigned time slot, the station transmits a pulse burst to the satellite which retransmits same to one or more stations for which it is destined. The pulse bursts transmitted by the various stations must reach the satellite transponder at specific instants to prevent overlapping and to enable the transponder to retransmit the pulse bursts serially. It is, therefore, essential that the pulse bursts from the various stations be synchronized to ensure that they are transmitted at precise instants, thereby preventing "collisions" at the transponder.

In those TDMA networks which use a satellite comprising a global beam antenna adapted to carry the down-link traffic, synchronization of the stations is usually achieved by means of the so-called single loop technique wherein a given station designated as reference station transmits a reference pulse burst which is retransmitted by the satellite transponder to all stations of the network, each of which then adjusts the time at which it is to transmit its pulse burst in accordance with the time interval between the instant at which it receives the reference pulse burst and that at which it receives from the satellite a reference word it has transmitted thereto. The single loop synchronization technique has been widely described in the literature; in this connection, reference may be made to the article by H. Ganssmantel and B. Ekstrom entitled "TDMA Synchronization for Future Multitransponder Satellite Communication," International Conference on Communications, Minneapolis, June 17-19, 1974.

In TDMA networks, single-loop synchronization can only be used with those stations which are located in the geographical area wherein their own pulse burst are retransmitted, as in the case of TDMA networks which use a satellite equipped with a global beam antenna to carry the down-link traffic. At the present time, the trend is to use satellites comprising narrow, or spot, beam directional antennas to carry such traffic. This results in improved overall system performance and is made easier by the increased precision of today's satellite stabilization techniques. In those networks which use a satellite equipped with directional beam antennae transmitting signals at different frequencies, the stations are unable to receive their own pulse bursts from the satellite and, consequently, the network cannot be synchronized using the signal-loop technique.

To synchronize a TDMA network comprising a satellite equipped with directional beam antennae transmitting signals at various frequencies, the so-called SDMA/SS-TDMA (Space Division Multiple Access/Spacecraft Switched Time Division Multiple ACCESS) technique has been developed. In this technique, synchronization of the stations is achieved by means of an absolute time reference provided by the satellite. For more details, reference should be made to the article by M. Asahara, et al. entitled "Synchronization and Acquisition in SDMA Satellite Communication System," International Conference on Communications, Minneapolis, June 17-19, 1974. Obviously, the SDMA/SS-TDMA technique requires the use of very expensive equipment carried by the satellite.

Another technique for synchronizing a TDMA network comprising a satellite equipped with directional beam antennae transmitting signals at various frequencies is described in French Pat. No. 72 46741 (publication no. 2,169,074). In that technique, the satellite includes, in addition to the various directional beam antennae which transmit signals between the various stations, a global beam antenna which performs the same function and allows the use of the single-loop synchronization technique. Obviously, the synchronization technique described in that patent requires a duplication of the satellite-borne equipment and increases the cost and the weight of the satellite.

OBJECTS OF THE INVENTION

It is, therefore, a first object of this invention to provide a method and a system for synchronizing a TDMA network comprising a satellite equipped with several directional beam antennas transmitting signals at various frequencies, in which no additional satellite-borne equipment is required.

It is another object of this invention to provide a method and a system for synchronizing a TDMA network comprising a satellite equipped with several directional beam antennas transmitting signals at various frequencies, in which no reference station is necessary.

SUMMARY OF THE INVENTION

These, and other objects, features, and advantages are accomplished by the invention disclosed herein.

Generally, this invention provides a method and a system for synchronizing within a recurrent time frame, the starting points of the transmissions from the various stations in a TDMA network wherein N stations distributed among M separate zones covered by M different down-link frequencies exchange pulse bursts through a satellite, each pulse burst being comprised of a preamble, a unique word, the transmitting station's address and traffic data. The satellite includes a global beam antenna which covers all of the M zones and is adapted to receive M different up-link frequencies, means for converting these M up-link frequencies to M corresponding down-link frequencies, and M directional beam antennas covering the M zones, each of said M antennas being adapted to transmit the down-link frequency associated with the particular zone it covers.

In accordance with the method of the present invention, the bursts transmitted by the various stations are assigned a predetermined position within the frame. Each station detects whether it has received a unique word followed by the address of a given station. Upon detecting such an address, the station activates timing means which define a time interval associated with the station whose address has been detected and, at the end of that time interval, starts transmitting M successive bursts respectively destined for the M zones during predetermined time intervals within the frame. These M bursts are transmitted at different up-link frequencies so that the burst intended for a given zone will be transmitted at the up-link frequency corresponding to the down-link frequency for that zone.

In accordance with an embodiment of the invention, the timing means comprise N timers respectively defining N time intervals associated with the N stations. The start of a station's transmission is determined by the timer which reaches its stopping point first.

According to another embodiment of the invention, the frame is divided into N' equal time intervals, where N' is the largest number of stations in a given zone, and a maximum of M stations, one station at most per zone, can transmit simultaneously during any one of these time intervals, the other stations remaining quiescent.

The foregoing and other objects, features and advantages of the invention will be apparent from the following more particular description of a preferred embodiment of the invention, as illustrated in the accompanying drawings.

DISCUSSION OF THE PREFERRED EMBODIMENT

Figure 1:
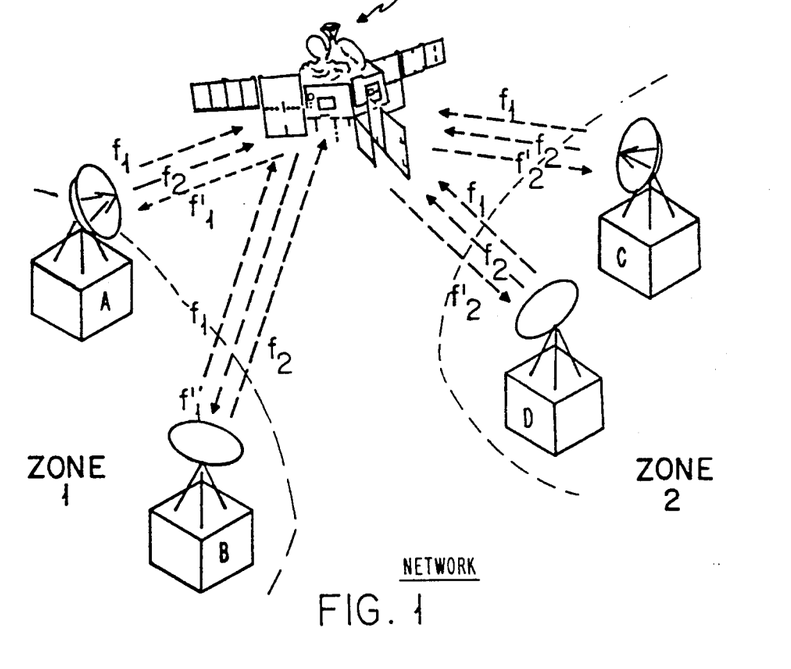
FIG. 1 illustrates an exemplary network configuration using the present invention.

Referring now to FIG. 1, an exemplary network configuration using the present invention is shown. The network comprises a satellite S and several earth stations, only four of which, designated A-D, have been illustrated. The satellite S (shown in greater detail in FIG. 1A) which may be, for example, the so-called "Symphonie" satellite, is equipped with a global beam antenna, ANR, which receives the up-link traffic from all stations in the network, and with two directional beam antennas, ANT 1 and ANT 2, which carry the down-link traffic to two distinct geographical zones, respectively. The antenna ANT 1 covers a first zone designated ZONE 1, which may be, for example, the eastern coast of the United States and in which stations A and B are located. The antenna ANT 2 covers a second zone, designated ZONE 2, which may be Europe and in which stations C and D are located. The antennas ANT 1 and ANT 2 are respectively associated with two transponders, TR 1 and TR 2. The transponder TR 1 converts an up-link frequency $f_1$ to a down-link frequency $f_1'$ is transmitted to ZONE 1 by the antenna ANT 1, and the transponder TR 2 converts an up-link frequency $f_2$ to a down-link frequency $f_2'$ transmitted to ZONE 2 by the antenna ANT 2. The global beam antenna ANR can receive both up-link frequencies $f_1$ and $f_2$.

Figure 1A:
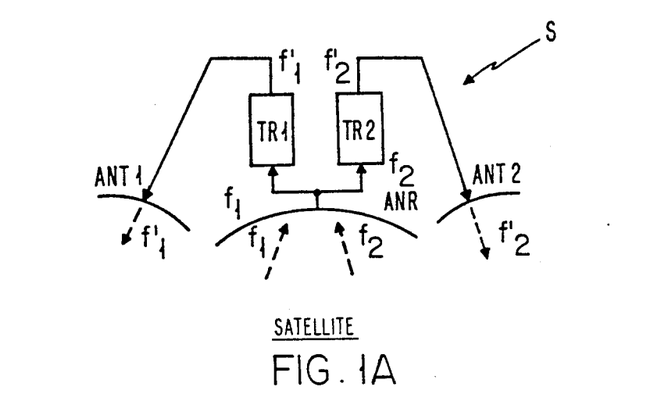
FIG. 1A is a schematic illustration of the satellite S of FIG. 1.

To interconnect all four stations of the network, each of these must provide up-link access to each of the two satellite transponders. Each station transmits at the two up-link frequencies $f_1$ and $f_2$. The stations located in ZONE 1 transmit at the up-link frequency $f_1$ to communicate with each other and at the up-link frequency $f_2$ to communicate with the stations in ZONE 2. The stations in ZONE 2 transmit at the up-link frequency $f_2$ to communicate with each other and at the up-link frequency $f_1$ to communicate with the stations in ZONE 1.

Thereafter, it will be assumed that different frequencies are used to cover the various zones. Those skilled in the art will readily understand that the present invention is not limited to a network comprising a satellite equipped with directional beam antennas transmitting signals at different frequencies, and that the satellite could be provided with additional directional beam antennas covering additional zones and transmitting signals at the same down-link frequencies as the other antennas. In such a case, zones covered by the same down-link frequency shall be deemed to constitute a single zone within the meaning of the invention.

Figure 2:
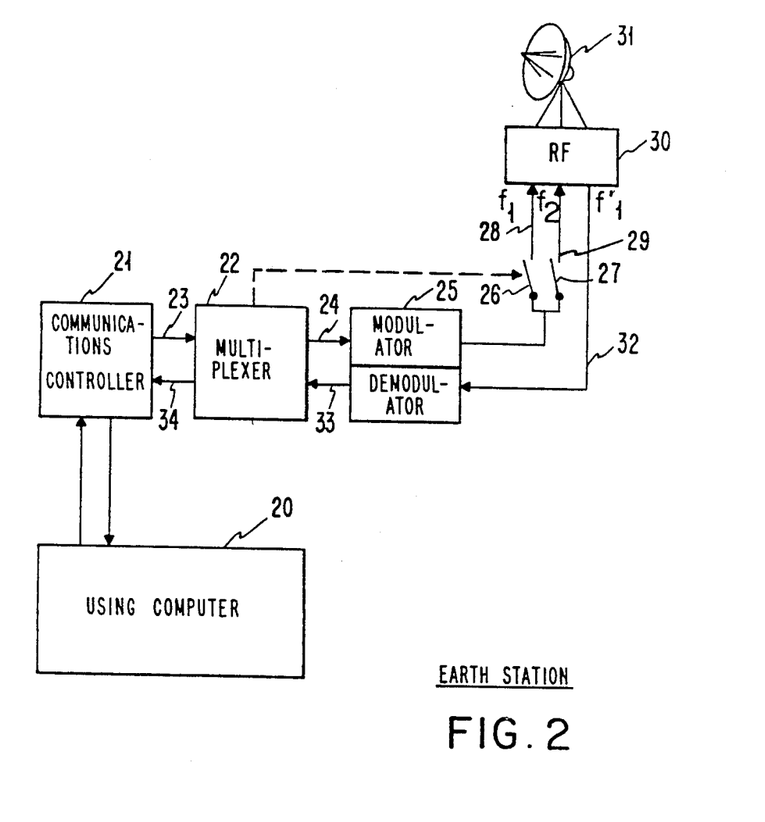
FIG. 2 is a schematic illustration of one of the earth stations of the network.

Referring now to FIG. 2, an exemplary earth station pertaining to the network of FIG. 1 and incorporating the invention is shown. The station includes a using unit 20, which may be, for example, a computer, connected to a communications controller 21, such as the IBM 2701 Communications Controller. The controller 21 is connected to a network multiplexer 22 according to the invention and which will be described in detail with reference to FIG. 6. The network multiplexer 22 synchronizes the transmission of the data bursts it receives from the controller 21 via a line 23 within predetermined time intervals to achieve maximum utilization of the satellite transponders without mutual interference between the stations. The data bursts provided by the network multiplexer 22 are fed via a line 24 to the modulator MOD of a modem 25. The output from the modulator MOD is applied in parallel to a first terminal of each of two switches 26 and 27 whose second terminals are respectively connected to two inputs 28 and 29 of the station's RF equipment 30. The opening and the closure of the switches 26 and 27 are controlled by the network multiplexer 22. When the bursts are to be transmitted at the up-link frequency $f_1$, the switches 26 and 27 are respectively closed and open, and the output from the modulator MOD is applied to the input 28 of the RF equipment 30, from which it is transmitted at the frequency $f_1$ by the antenna 31. When the bursts are to be transmitted at the up-link frequency $f_2$, the swithces 26 and 27 are respectively open and closed, and the output from the modulator MOD is applied to the input 29 of the RF equipment 30, from which it is transmitted at the up-link frequency $f_2$ by the antenna 31. The signals received from the satellite by the antenna 31 are applied through the equipment 30 and a line 32 to the input of the demodulator DEM of the modem 25. The output signals from the demodulator DEM are inputted via a line 33 to the network multiplexer 22 which transfers them selectively to the controller 21 via a line 34.

Figure 3:
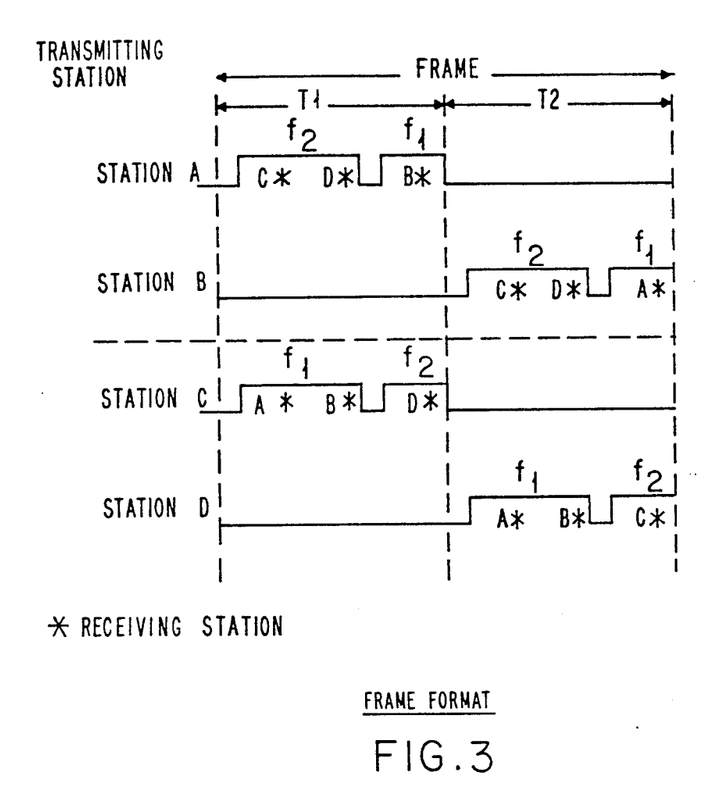
FIG. 3 is an exemplary illustration of the frame format used in the invention.

The method of the present invention will now be described in detail. The network multiplexer 22 controls the start of the next transmission by the station in which it is located, so as to ensure that the bursts transmitted by the various stations are synchronized within a transmission frame. The relative positions of the various bursts within a frame are shown in FIG. 3. In a preferred embodiment of the invention, the frame is divided into two equal time intervals designated T1 and T2, respectively. During the first half, T1 of the frame, two stations located in separate zones, for example station A in ZONE 1 and station C in ZONE 2, simultaneously transmit fixed-time-duration bursts while the other two stations are quiescent. During each half of the frame each station allows an interburst guard time to elapse, transmits a double burst destined for the stations located outside its own zone, allows an interburst guard time to elapse, and transmits a single burst destined for the other station in its own zone. During the first half, T1, of the frame, station A transmits a double burst destined for stations C and D at the up-link frequency $f_2$, then a single burst intended for station B at the up-link frequency $f_1$ while, in synchronism therewith, station C transmits a double burst destined for stations A and B at the frequency $f_1$, then a single burst destined for station D at the frequency $f_2$. During the second half, T2, of the frame, the other two stations, B and D, simultaneously transmit fixed-time-duration bursts in the same manner as stations A and C did during the first half, T1.

Figure 4A:
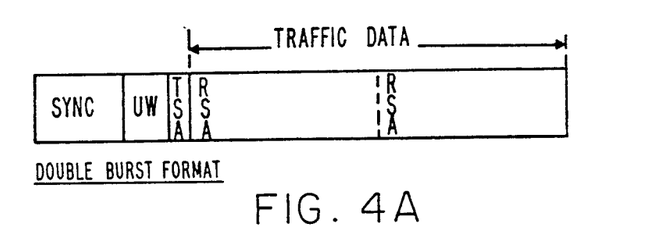
FIGS. 4A and 4B illustrate the format of a double burst and that of a single burst, respectively.

Referring now to FIG. 4A, the format of a double burst is shown. The double burst is comprised of a preamble designated SYNC that is used for modem acquisition and synchronization purposes and is followed by a synchronization word known as a Unique Word (UW). Such preambles and UW's are well-known in the art. The UW is followed by the address of the transmitting station (TSA). This address is in turn followed by traffic data, which includes the address of the first receiving station (RSA) followed by the data intended for that station, and the address of the second receiving station followed by the data therefor.

Figure 4B:
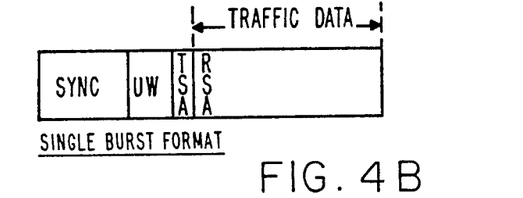

FIG. 4B shows the format of a single burst. This consists of a modem acquisition and synchronization preamble (SYNC), a unique work (UW), the transmitting station's address (TSA) and traffic data. The latter data includes the receiving station's address followed by the data intended for that station.

It should be noted that the unique word is the same for all stations in the network.

The method of synchronization which allows a given station to determine the time at which its bursts are to be transmitted will now be described. In any frame, each station transmits its bursts during predetermined time intervals. As mentioned above, each burst includes a unique word followed by the address of the transmitting station. A station, for example, station D, detects a UW, then decodes the transmitting station's address which follows that UW, for example the address of station A, and initiates a timer associated with station A. This timer defines the appropriate time interval, TA, which must elapse between receipt of the address of station A and the start of station D's transmission of the next bursts.

In normal operation, if all stations are transmitting, four UW's and four addresses are detected within one frame duration. In a preferred embodiment, each station is equipped with four timers respectively associated with the four stations in the network. Ideally, the four timers should provide the same transmission start-up times. However, due to variable propagation times and timer inaccuracies, the four start-up times may not be concurrent. In one embodiment of the invention, the start of the next bursts' transmission is determined by the fastest of the four timers, i.e. by the timer which reaches its stopping point first.

Figure 5:
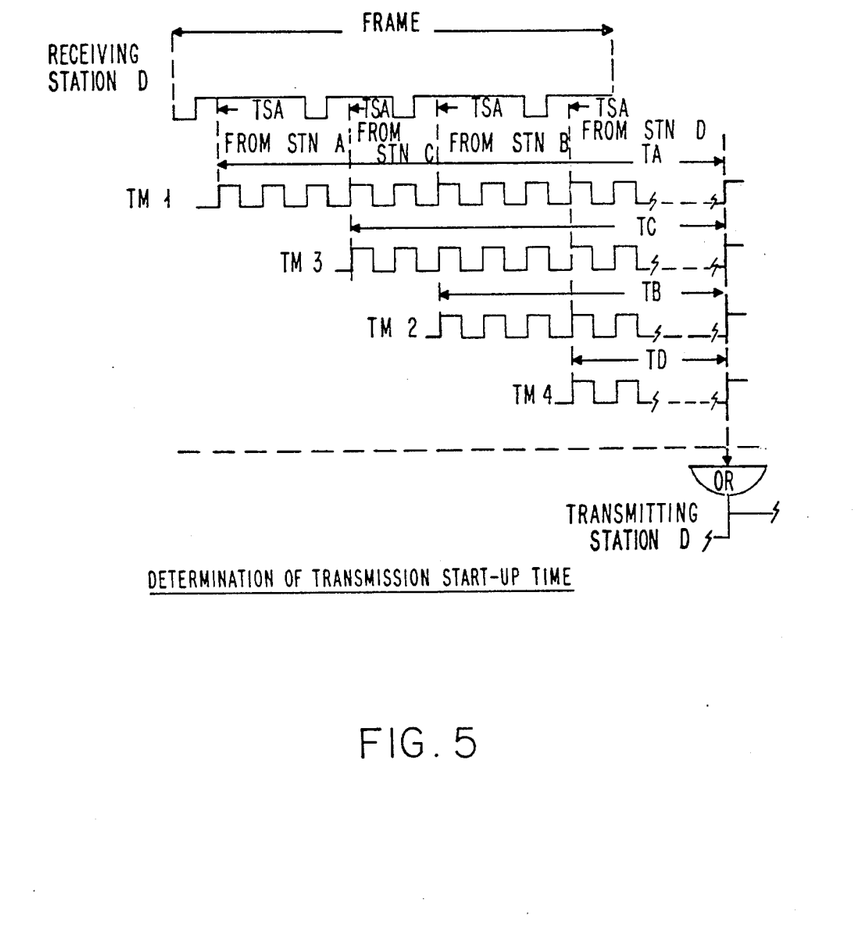
FIG. 5 is a schematic illustration of the manner in which a transmission start-up time is determined.

The above method of synchronization will now be described in detail with reference to FIGS. 3 and 5, the latter figure being a diagram which should make it easier to understand the method. FIG. 5 shows the burst sequence received by station D during the time frame illustrated in FIG. 3. Station D, which is located in ZONE 2, only receives those bursts which are retransmitted by the satellite at the down-link frequency $f_2'$, that is, the bursts previously transmitted to the satellite at the up-link frequency $f_2$. Thus, station D initially receives the double burst transmitted by station A. Station D detects the unique word UW contained in the burst and the address of station A that follows the UW.

The detection of this address initiates a first timer TM1 which defines the time interval TA that must elapse between detection of the address and the start of the next transmission by station D. Station D then receives the single burst transmitted by station C. The detection of station C's address initiates a second timer TM3 which defines a time interval TC that is different from TA but must nevertheless provide a transmission start-up time substantially coincident with that provided by the timer TM1. Station D then receives the double burst transmitted by station B and initiates a timer TM2 associated with station B. Lastly, station D receives the single burst it has transmitted and initiates a timer TM4 associated with itself. The start-up time for station D's transmission is obtained by simply OR'ing the outputs of the four timers TM1-TM4.

It should be noted that this method maintains synchronization of the network even if one or more stations stop operation. If only one station remains, it will start transmitting upon detecting its own address. The network is also self-synchronized since a new station ready to transmit synchronizes to the current operating stations.

Figure 6:
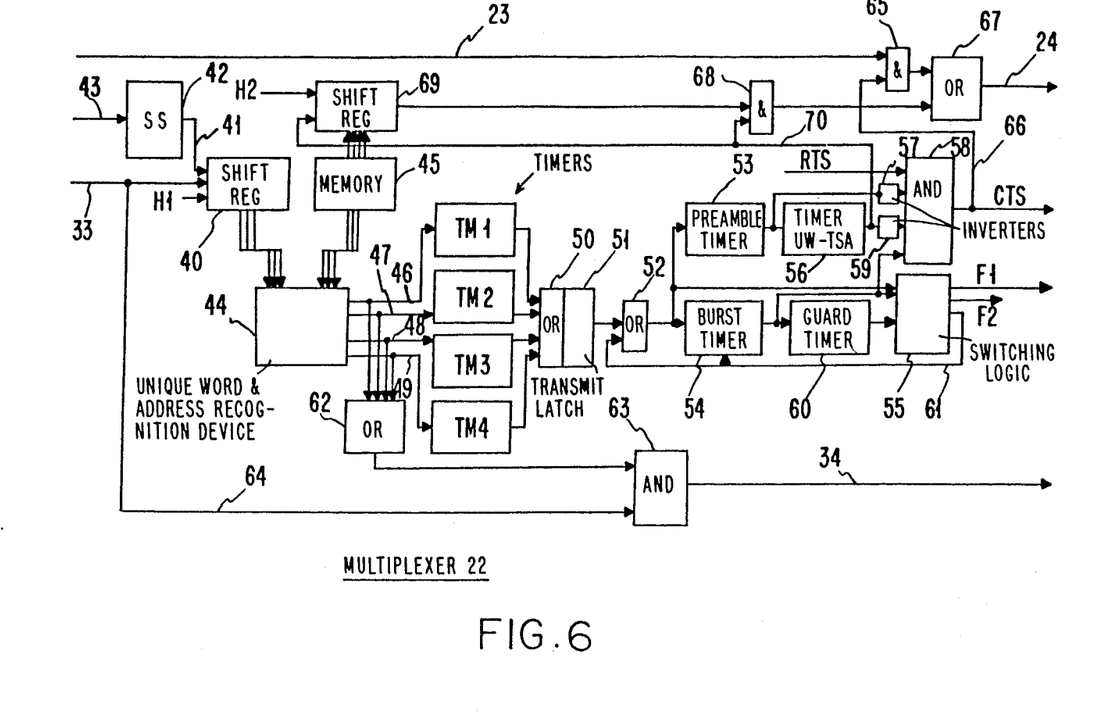
FIG. 6 is a block diagram of the multiplexer 22 of FIG. 2.

FIG. 6 is an exemplary embodiment of the network multiplexer 22 shown in block form in FIG. 2. The network multiplexer 22 includes a shift register 40 which has its input connected via line 33 to the output of the demodulator DEM of the modem 25 (FIG. 2). The loading of the shift register 40 is enabled by a signal provided by a single-shot 42 on a line 41. The single-shot 42 is turned on by a signal supplied by the carrier detector of the demodulator DEM on a line 43. The bits stored in the shift register 40 are applied in parallel to a unique word and address recognition device 44 which also receives the output from a memory 45. The device 44, which will be described in detail with reference to FIG. 6A, has four outputs respectively connected via lines 46, 47, 48 and 49 to the inputs of four timers TM1, TM2, TM3, and TM4. The outputs of the four timers TM1-TM4 are connected to the input of an OR gate 50 whose output controls a transmit latch 51. The output from the latch 51 is inputted to an OR gate 52 whose output is applied in parallel to a preamble timer 53, a burst timer 54 and a switching logic 55. The output of the preamble timer 53 is connected to the input of a timer UW-TSA 56 and through an inverter 57 to an input of an AND gate 58 another input of which receives the "Request to Send" (RTS) signal supplied by the controller 21. The AND gate 58 also receives as inputs the output from the timer 54 and the output from the timer 56 as inverted by an inverter 59. The output from the AND gate 58 provides the "Clear to Send" (CTS) signal intended for the controller 21. The output from the burst timer 54 is applied in parallel to the logic 55 and to a guard time timer 60 which has its output connected to the logic 55. The logic 55 has two outputs, F1 and F2, which control switches 26 and 27 (FIG. 2), respectively, and a third output which is connected via a line 61 to the burst timer 54 and to the other input of the OR gate 52.

The four outputs of the recognition device 44 are also connected to the inputs of an OR gate 62 whose ouput is connected to an input of an AND gate 63 which has its other input connected via a line 64 to the line 33. The output of the AND gate 63 is connected to the input of the controller 21 via the line 34.

The output of the controller 21 is connected via the line 23 to an input of an AND gate 56 which has its other input connected to the output of the AND gate 58 via a line 66. The output of the AND gate 65 is connected to an input of an OR gate 67 whose output is connected to the input of the modulator MOD of the modem 25 via the line 24. The other input of the OR gate 67 is connected to the output of an AND gate 68 an input of which is connected to the output of a shift register 69 which is loaded in parallel with the data stored in the memory 45. The loading of the shift register 69 and the stepping of its contents therethrough are both enabled by the output signal from the timer UW-TSA 56 applied thereto via a line 70. The line 70 is also connected to the other input of the AND gate 68. The data is stepped through the shift register 69 under control of transmit clock pulses H2 provided by the controller 21.

Each of the timers in the network multiplexer 22 is conventionally comprised of a down counter that is initially set to a given value and, when initiated, counts down to zero under control of clock pulses. Each timer defines a predetermined time interval between the instant the counter is initiated and the instant it reaches the count of zero. A characteristic of the burst timer 54 is that it can define two different time intervals. The output from its counter is selectively fed back to its input under control of a signl provided by the logic 55 on the line 61. When the feedback loop is closed, the timer defines a time interval corresponding to the duration of a double burst, and when the loop is open, a time interval equal to the duration of a single burst.

The operation of the device illustrated in FIG. 6 will now be described. For clarity, it will be assumed that the network multiplexer shown in FIG. 6 is that associated with station D. When the demodulator DEM of the modem 25 (FIG. 2) detects the down-link frequency $f_2'$, it notifies the network multiplexer accordingly by generating a "Signal Detected" signal which is fed to the single-shot 42 via the line 43. In response to such signal, the single-shot 42 generates a pulse whose duration is substantially equal to the combined durations of the preamble (SYNC), the unique word (UW) and the transmitting station's address (TSA). This pulse is fed to the shift register 40 via the line 41. The length of the shift register is equal to the combined lengths of the UW and the TSA. For example, if the UW consists of nineteen bits the TSA consists of seven bits, the length of the shift register 40 will be 26 bits.

As long as the pulse generated by the single-shot 42 is present, the bits provided as the output of the demodulator DEM are loaded into the shift register 40 and stepped therethrough under control of receive clock pulses H1 supplied by the demodulator DEM. The bits stored in the shift register 40 are applied in parallel to the unique word and address recognition device 44, whose function is to detect whether a UW has been received and, if so, to detect the transmitting station's address which follows it. To this end, the device 44 also receives as inputs, replicas of the UW and of the addresses of the various stations in the network, stored in the memory 45.

When the device 44 has detected a UW followed by the address of station A, it generates on the line 46 a "Station A Detected" signal which initiates the timer TM1 associated with that station. Similarly, the timers TM2, TM3 and TM4 are respectively initiated by "Station B Detected," "Station C Detected," and "Station D Detected" signals provided by the device 44 on the lines 47 to 49. The timers TM1-TM4 respectively define the time intervals TA, TB, TC and TD mentioned in connection with FIG. 5.

Figure 7:
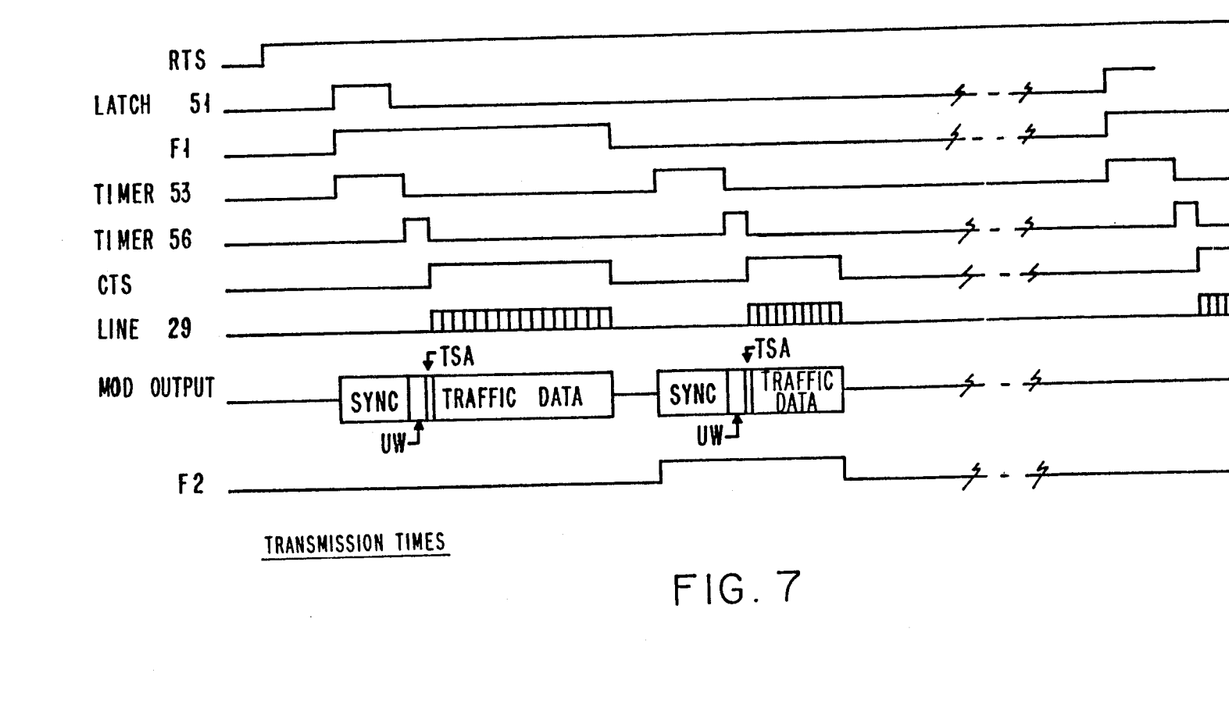
FIG. 7 is a timing diagram showing the transmission times.

The first of the four timers TM1-TM4 to reach the count of zero causes the transmit latch 51 to turn on at that time through the OR gate 50. The time at which the latch 51 is turned on defines the transmission start-up time for station D. In order that the transmission process may be more readily understood, reference should be made to the timing diagram of FIG. 7. It will be assumed that the "Request to Send" (RTS) signal provided by the controller 21 is high. When the transmit latch 51 turns on, it generates a start pulse which becomes available at the output of the OR gate 52. The leading edge of the start pulse activates the logic 55 which has its F1 output go high, thereby closing the switch 26 (FIG. 2) and conditioning the station to transmit at the up-link frequency $f_1$. The high output F1 is also detected by the modem 25 which starts generating and transmitting the synchronization preamble SYNC, as is well-known in the art. The leading edge of the start pulse initiates the burst timer 54 whose output controls the logic 55 to cause its output F1 to remain high for a time interval corresponding to a double burst. The leading edge of the start pulse also initiates the preamble timer 53 which defines a time interval equal to the duration of the preamble SYNC. During that interval, the preamble is transmitted by the modem 25. At the end of the preamble, the preamble timer intiates the unique word and address timer 56, which generates a pulse whose duration is equal to the combined durations of the unique word UW and the transmitting station's address. The pulse provided by the timer 56 is applied via the line 70 to the shift register 69 and enables the loading in parallel therein of the unique word UW and the address of station D that were stored in the memory 45. The UW and the address of station D are then transferred bit by bit to the modem 25 through the AND gate 68, the OR gate 67 and the line 24. At the end of the pulse provided by the timer 56, the AND gate 68 is disabled and the AND gate 58 is enabled to gate the "Clear to Send" (CTS) signal to the controller 21. In response thereto, the controller 21 places on the line 23 the traffic data which is applied to the modem 25 through the gates 65 and 67 and the line 24.

At the end of the double burst time interval determined by the burt timer 54, the AND gate 58 is disabled, thereby dropping the "Clear to Send" signal, and the guard time timer 60 is initiated, causing the two outputs F1 and F2 of the logic 55 to go low, thereby causing the two switches 26 and 27 (FIG. 2) to remain open during the guard time.

At the end of the guard time, the logic 55 has its F2 output go high, thereby closing the switch 27 (FIG. 2) and conditioning the station to transmit at the uplink frequency $f_2$. The logic 55 generates on the line 61 a pulse which is gated through the OR gate 52 and applied as a start pulse to the timers 53 and 54. The pulse present on the line 61 also conditions the burst timer 54 to define the duration of a single burst. The generation of a single burst is then initiated in a manner similar to that of a double burst.

At the end of the single burst time interval, the logic 55 has its outputs F1 and F2 go low and resets the timers. The system then waits for a new "Signal Detected" signal to occur on the line 43.

As already mentioned, the first of the four timers TM1-TM4 to reach the count of zero provides a signal which sets the transmit latch 51 and triggers the start of the next transmission by the station concerned. It should be noted that the signal provided by the other timers can be used to check the synchronization of the network.

So far, the manner in which the device shown in FIG. 6 synchronizes a given station's transmission has been described. A brief description of the manner in which it transfers the bursts to the controller 21 will now be provided. The bits received from the one demodulator DEM are applied via the lines 33 and 64 to an input of the AND gate 63. As soon a the recognition device 44 has detected a unique word UW followed by a transmitting station's address, it generates a signal on one of the lines 46 to 49, as explained earlier. This signal is gated through the OR gate 62 and enables the AND gate 63, thereby allowing the traffic data which follows the detected address of the transmitting station to be transferred to the controller 21 through the line 64, the AND gate 63 and the line 34. It should be noted that the network multiplexer only controls the synchronization of the network and that the addresses of the receiving stations as well as all traffic data are handled by the communications controller 21.

Figure 6A:
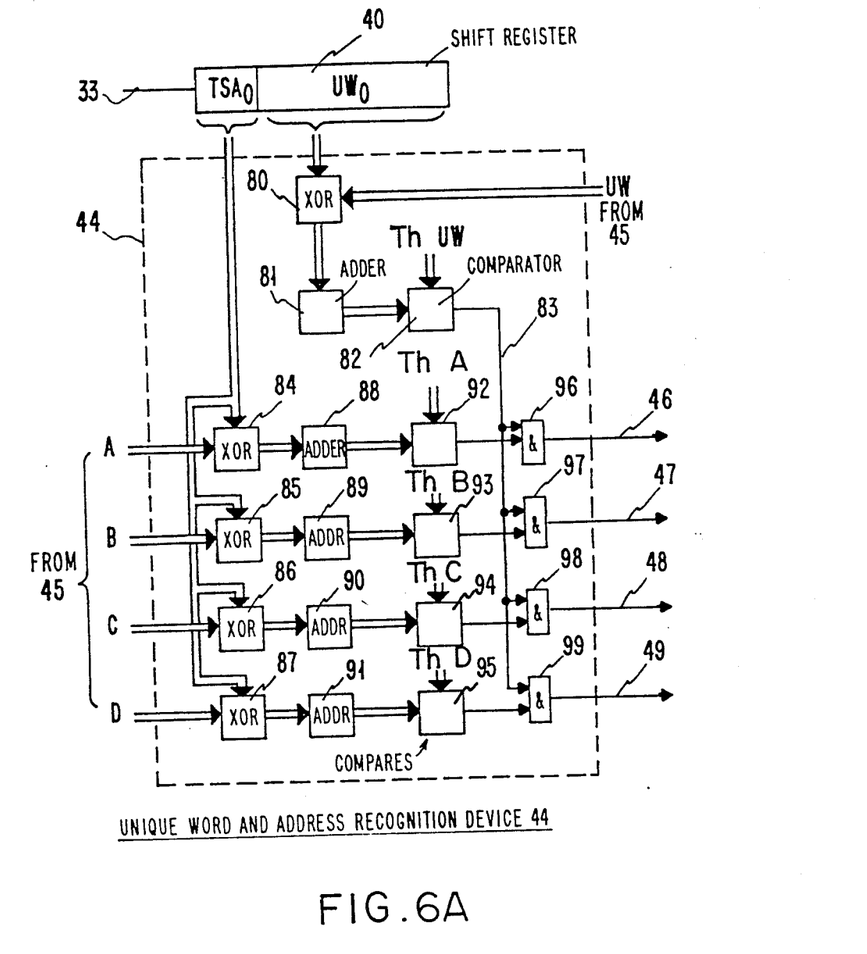
FIG. 6A is a detailed view of the unique word and address recognition device of FIG. 6.

An exemplary embodiment of the unique word and address recognition device 44 is illustrated in FIG. 6A. It will be assumed that the unique word UW comprises nineteen bits and the address TSA seven bits. The last nineteen bits which are stored in the shift register 40 and make up a word designated $UW_o$ are applied in parallel to a set 80 of nineteen Exclusive OR Inverter circuits which also receive the nineteen bits of the unique word UW stored in the memory 45. Each of the Exclusive OR Inverter circuits has its two inputs respectively connected to those bits of the words $UW_o$ and UW which have the same weight and provides at its output a "1" if these bits are identical. The outputs from the Exclusive OR Inverter circuits in the set 80 are fed to timers can be used to check the synchronization of the network.

So far, the manner in which the device shown in FIG. 6 synchronizes a given station's transmissions has been described. A brief description of the manner in which it transfers the bursts to the controller 21 will now be provided. The bits received from the the demodulator DEM are applied via the lines 33 and 64 to an input of the AND gate 63. As soon as the recognition device 44 has detected a unique word UW followed by a transmitting station's address, it generates a signal on one of the lines 46 to 49, as explained earlier. This signal is gated through the OR gate 62 and enables the AND gate 63, thereby allowing the traffic data which follows the detected address of the transmitting station to be transferred to the controller 21 through the line 64, the AND gate 63 and the line 34. It should be noted that the network multiplexer only controls the synchronization of the network and that the addresses of the receiving stations as well as all traffic data are handled by the communications controller 21.

An exemplary embodiment of the unique word and address recognition device 44 is illustrated in FIG. 6A. It will be assumed that the unique word UW comprises nineteen bits and the address TSA seven bits. The last nineteen bits which are stored in the shift register 40 and make up a word designated $UW_o$ are applied in parallel to a set 80 of nineteen Exclusive OR Inverter circuits which also receive the nineteen bits of the unique word UW stored in the memory 45. Each of the Exclusive OR Inverter circuits has its two inputs respectively connected to those bits of the words $UW_o$ and UW which have the same weight and provides at its output a "1" if these bits are identical. The outputs from the Exclusive OR Inverter circuits in the set 80 are fed to an adder 81 which sums "1" provided by these circuits. Thus, if the word $UW_o$ and the replica of the UW are identical, the adder 81 will provide the binary-coded value "19." To detect a unique word, it is not required that the adder 81 provide the value "19," but a detection threshold, Th UW, equal, for example, to "17" is set. The output from the adder 81 is compared with the threshold Th UW in a comparator 82 which provides a high on its output line 83 to indicate that a UW has been detected, if the output from the adder 81 is higher than or equal to the threshhold Th UW.

The transmitting station's address is detected in a similar manner. The first seven bits stored in the shift register 40 and which will be designated $TSA_o$ are applied in parallel to four sets 84-87 of seven Exclusive OR Inverter circuits each. These four sets also receive, respectively, the addresses of stations A-D stored in the memory 45. The operation of the sets 84-87 is identical to that of the set 80. The outputs from the sets 84-87 are respectively applied to four adders 88-91 similar to the adder 81. The outputs from the adders 88-91 are respectively compared with detection thresholds Th A, Th B, Th C, and Th D in comparators 92-95 whose outputs are respectively connected to an input of each of four AND gates 96-99, the other input of each of which is connected to the output of the comparator 82 via the line 83. The outputs of the AND gates 96-99 are respectively connected to the lines 46-49 (FIG. 6).

If the output from the adder 88 is higher than or equal to the detection threshold Th A of the address of station A, the comparator 92 will provide a high, but this high will only cause a "Station A Detected" signal to be generated on the output line 46 if a high is present at the output of the comparator 82. The "Station B Detected," "Station C Detected," and "Station D Detected" signals are obtained in a similar manner on the output lines 47-49 of the AND gates 97-99, respectively.

While the method of the present invention has been described above in relation to its application to a network comprising four stations located in two separate geographical zones, those skilled in the art will readily understand that it could be extended to any number of stations located in any number of geographical zones.

Figure 8:
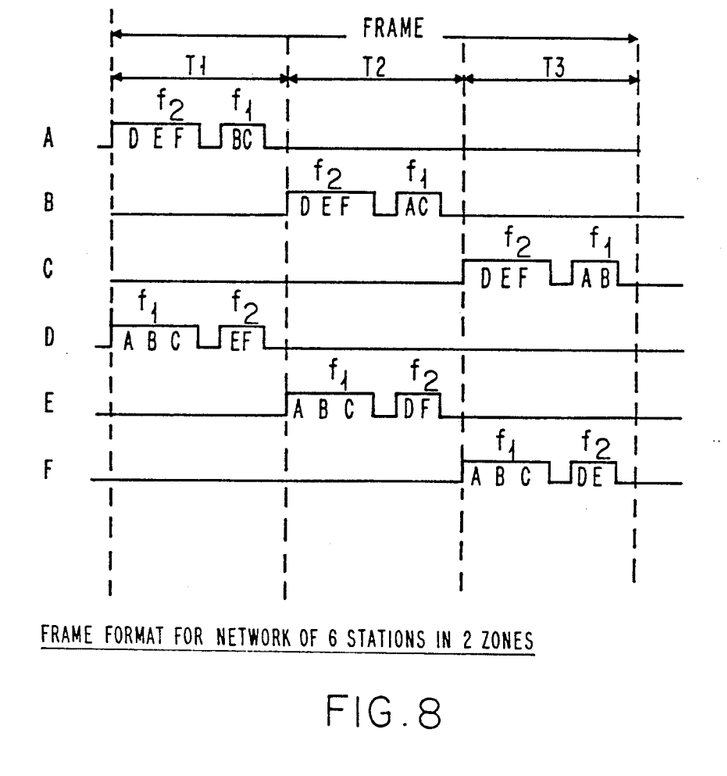
FIG. 8 is an example of the frame format used in the case of a network comprised of six stations distributed among two zones.

A brief description of the present method as applied to a network comprising six stations equally distributed among two distinct zones will now be given with reference to FIG. 8. Three stations, A, B, and C are located in a first zone which can only receive the down-link frequency $f_1'$ associated with the up-link frequency $f_1$, and three stations, D, E, and F are located in a second zone which can only receive the down-link frequency $f_2'$ associated with the up-link frequency $f_2$. The frame is divided into three equal time intervals, T1, T2, and T3. During T1, station A transmits a triple burst intended for stations D, E, and F at the up-link frequency $f_2$, this being followed, after a guard time, by a double burst destined for stations B and C at the up-link frequency $f_1$. Simultaneously, station D transmits a triple burst destined for stations A, B, and C at the up-link frequency $f_1$ and, after a guard time, a double burst destined for stations E and F at the up-link frequency $f_2$. The other stations are quiescent. During the time interval T2, stations B and E transmit as shown in FIG. 8. During T3, the transmitting stations are stations C and F.

A triple burst is similar to a double burst and comprises a preamble, the transmitting station's address, and traffic data.

Each station can transmit selectively at the two up-link frequencies $f_1$ and $f_2$, but can only receive a single down-link frequency. The synchronization of a given station's burst transmissions is achieved in a similar manner, except that each station includes six timers TM1-TM6, respectively associated with stations A and F. Each timer defines the time interval that must elapse between detection of the transmitting station's address and the start of the receiving station's transmission of the next bursts.

Lastly, a brief description of the method of the present invention, as applied to a network comprising six stations A-F equally distributed among three distinct zones, will be given with reference to the diagram of FIG. 9. Stations A and B are located in a first zone which can only receive the down-link frequency $f_1'$ corresponding to the up-link frequency $f_1$. Stations C and D are located in a second zone which can only receive the down-link frequency $f_2'$ corresponding to the up-link frequency $f_2$, and stations E and F are located in a third zone which can only receive the down-link frequency $f_3'$ corresponding to the up-link frequency $f_3$.

The frame is divided into two equal time intervals T1 and T2. During T1, station A transmits a double burst destined for stations C and D at the up-link frequency $f_2$, then a double burst intended for stations E and F at the up-link frequency $f_3$, and lastly a single burst destined for station B at the up-link frequency $f_1$. Simultaneously, station C transmits a double burst intended for stations E and F at the up-link frequency $f_3$, then a double burst intended for stations A and B at the up-link frequency $f_1$, and lastly a single burst intended for station D at the up-link frequency $f_2$. Still during the time interval T1, station E transmits a double burst destined for stations A and B at the up-link frequency $f_1$, then a double burst destined for stations C and D at the up-link frequency $f_2$, and lastly a single burst destined for station F at the up-link frequency $f_3$. The other stations are quiescent during T1.

Figure 9:
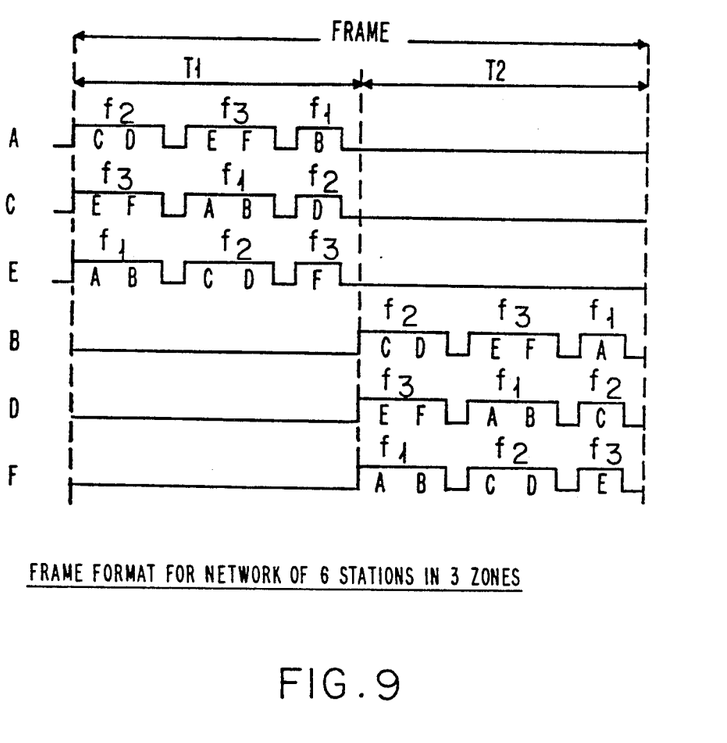
FIG. 9 is an example of the frame format used in the case of a network comprised of six stations distributed among three zones.

During the time interval T2, stations B, D and F will be transmitting simultaneously and stations A, C and E will remain quiescent, as shown in FIG. 9.

Each station can transmit selectively at the three up-link frequencies $f_1$, $f_2$ and $f_3$, but can only receive one down-link frequency. Each station comprises six timers respectively associated with the six stations A-F, and each timer defines the timer interval between detection of the address of the station with which it is associated and the start of the receiving station's transmission of the next bursts.

On the basis of the examples illustrated in FIGS. 3, 8, and 9 those skilled in the art will readily understand the manner in which the method of the present invention could be applied to a network comprising N distinct stations located in M distinct zones. In such a case, each station should have the ability to transmit selectively at M up-link frequencies, each frequency being associated with one of the M zones. Each station should include N timers. Preferably, and to enhance system efficiency, the frame format should be as follows. Assuming that $N'$ is the largest number of stations in a given zone, the frame should be divided into $N'$ equal time intervals and a maximum of M stations, one station at most per zone, would transmit simultaneously during each time interval.

While the invention has been particularly shown and described with reference to a preferred embodiment thereof, it will be understood by those skilled in the art that numerous changes in form and detail may be made therein without departing from the spirit and scope of the invention.

Having thus described our invention, what we claim as new, and desire to secure by Letters Patent is:

1. In a satellite communication network wherein N stations located in M distinct zones respectively covered by M different down-link frequencies exchange pulse bursts, each of which comprises in succession a preamble, a unique word, the transmitting station's address, and traffic data, by means of a satellite that includes a global beam antenna covering all of the M zones and adapted to receive M different up-link frequencies, means for converting the M up-link frequencies to M corresponding down-link frequencies, and M directional beam antennas respectively covering the M zones, each of said M antennas being adapted to transmit the down-link frequency associated with the zone covered by that antenna, a method of synchronizing the starting points of the station's transmissions within a recurrent time frame, the method comprising the steps of: receiving at each station the down-link frequency associated with the zone in which it is located and detecting whether it has received a unique word followed by a given station's address;

determining at each station a transmission start-up time selected from one of predetermined time intervals consequent to each detection by that station of a unique word followed by a given station's address, said time interval being dependent upon the station whose address has been detected; and transmitting succesively at each station, from said transmission start-up time onwards, M bursts respectively destined for the M zones during predetermined time intervals within the frame, said M bursts being transmitted at different up-link frequencies so that a burst intended for a given zone will be transmitted at the up-link frequency corresponding to the down-link frequency for that zone.

2. The method of claim 1, wherein N' is the largest number of stations in a given zone, the frame is divided into N' equal time intervals and a maximum of M stations, at most one station per zone, transmit simultaneously during one of said time intervals, the other stations remaining quiescent.

3. In a satellite communication network wherein N stations located in M distinct zones respectively covered by M different down-link frequencies exchange pulse bursts, each of which includes a unique word followed by the transmitting station's address, by means of a satellite that includes a global beam antenna covering all of the M zones and adapted to receive M different up-link frequencies, means for respectively converting the M up-link frequencies to M corresponding down-link frequencies, and M directional beam antennas respectively covering said M zones, each of said M antennas being adapted to transmit the down-link frequency associated with the zone covered by that antenna, a system for synchronizing within a recurrent frame the time intervals during which the stations transmit pulse bursts, each station comprises:

means for receiving the down-link frequency associated with the zone in which the station is located;

detection means for detecting whether a unique word followed by a given station's address has been received;

timing means for determining a transmission start-up time selected from one of predetermined time intervals consequent to each detection of a unique word followed by a given station's address by said detection means, said time interval being dependent upon the station whose address has been detected; and means for succesively transmitting, from said transmission start-up time onwards, M bursts respectively destined for said M zones during predetermined time intervals within said frame, said M bursts being transmitted at different up-link frequencies so that a burst intended for a given zone will be transmitted at the up-link frequency corresponding to the down-link frequency for that zone.

4. The apparatus of claim 3, wherein N' is the largest number of stations in a given zone, the frame is divided into N' equal time intervals and a maximum of M stations, at most one station per zone, transmit simultaneously during one of said time intervals, the other stations remaining quiescent.

5. In a satellite communication network wherein N stations located in M distinct zones respctively covered by M different down-link frequencies exchange pulse bursts, each of which includes a unique word followed by the transmitting station's address, by means of a satellite that includes a global beam antenna covering all of the M zones and adapted to receive M different up-link frequencies, means for respectively converting the M up-link frequencies to M corresponding down-link frequencies, and M directional beam antennas respectively covering said M zones, each of said M antennas being adapted to transmit the down-link frequency associated with the zone covered by that antenna, and wherein each station includes radio frequency equipment adapted to selectively transmit said M up-link frequencies and to receive the down-link frequency associated with the zone in which it is located, a modem in which the input of the demodulator is connected to the output of the RF equipment and the output of the modulator is connected to the input of said RF equipment, and a communications controller, a system for synchronizing within a recurrent frame the time intervals during which the stations transmit the pulse bursts, each station comprising:

detection means connected to the output of the demodulator of the modem for detecting whether a unique word followed by a given station's address has been received;

timing means for determining a transmission start-up time selected from one of predetermined time intervals consequent to each detection of a unique word followed by a given station's address by said detection means, said time interval being dependent upon the station whose address has been detected;

generating means for generating said unique word followed by a given station's address;

means for successively forming, beginning at said transmission start-up time, M bursts respectively destined for said M zones during predetermined time intervals within the frame, each burst comprising said unique word followed by a given station's address as generated by aid generating means and data provided by the communications controller; and means for selectively controlling said RF equipment so that the M bursts will be transmitted at different up-link frequencies, a burst destined for a given zone being transmitted at the up-link frequency corresponding to the down-link frequency for that zone.

6. The apparatus of claim 5, wherein said timing means further comprises:

N timers, each of which defines a predetermined time interval and is associated with one of the N stations, the timer associated with a given station being initiated upon said detection means detecting that station's address; and means for providing said transmission start-up time at the end of the first of the time intervals defined by said N timers.

* * * * *